United States Patent [19]
Hunt

[11] Patent Number: 5,495,690
[45] Date of Patent: Mar. 5, 1996

[54] ELECTRONIC FIREFLY LURE

[76] Inventor: Jack Hunt, 69034 42nd Ave., Covert, Mich. 49043

[21] Appl. No.: 371,289
[22] Filed: Jan. 11, 1995
[51] Int. Cl.$^6$ .................................................. A01K 85/01
[52] U.S. Cl. .......................................... 43/17.6; 43/42.25
[58] Field of Search ................................... 43/17.6, 42.25

[56] References Cited

U.S. PATENT DOCUMENTS

| | | |
|---|---|---|
| Re. 19,160 | 5/1934 | Wright et al. . |
| 1,420,422 | 6/1922 | Foss ........................................ 43/42.25 |
| 1,635,644 | 7/1927 | Sloan ....................................... 43/42.25 |
| 2,078,798 | 4/1937 | Hoefer .................................... 43/42.25 |
| 2,097,357 | 10/1937 | Watts ..................................... 362/267 |
| 2,237,534 | 4/1941 | Van Der Clute ....................... 43/42.05 |
| 2,431,420 | 11/1947 | Pope, Sr. ................................ 43/17.5 |
| 2,458,611 | 1/1949 | Long ...................................... 43/17.5 |
| 2,536,408 | 1/1951 | Addicks ................................. 43/17.5 |
| 3,213,562 | 10/1965 | Salvin et al. .......................... 43/17.6 |
| 3,708,903 | 1/1973 | Bercz et al. ........................... 43/17.6 |
| 3,940,868 | 3/1976 | Northcutt ............................... 43/17.6 |
| 4,437,256 | 3/1984 | Kulak .................................... 43/17.5 |
| 4,516,350 | 5/1985 | Malphrus ............................... 43/17.6 |
| 4,741,120 | 5/1988 | Cota et al. ............................. 43/17.6 |
| 4,888,904 | 12/1989 | Douglas, Jr. .......................... 43/17.6 |
| 5,157,857 | 10/1992 | Livingston ............................ 43/17.6 |
| 5,195,266 | 3/1993 | Troescher ............................... 43/17.6 |

FOREIGN PATENT DOCUMENTS 59225  4/1938  Norway .................................. 43/17.6

Primary Examiner—P. Austin Bradley
Assistant Examiner—Jeanne M. Elpel
Attorney, Agent, or Firm—Flynn, Thiel, Boutell & Tanis

[57] ABSTRACT

An electronic fishing lure which may be used to simulate a firefly and includes a fish attractive light source which is mounted on a shank of a hook, a battery mounting plate secured to the shank and electrically connected to one terminal of the light source, a spring clip extending above the battery mounting plate and electrically connected to a second terminal of the light source, and a removable battery force fitted between the mounting plate and the spring clip to activate the light source and imitate the visual presentation of a firefly.

19 Claims, 1 Drawing Sheet

ELECTRONIC FIREFLY LURE

FIELD OF THE INVENTION

The invention generally relates to an electronic fishing lure having a fish attractive light source and, more particularly, to an electronic fishing lure which simulates a firefly and includes a blinking light source which is mounted on a shank of a hook.

BACKGROUND OF THE INVENTION

To improve fishing success, anglers appreciate that fish respond best to fishing lures which are able to reproduce the appearance and action of the fish's prey such as insects or other fish. Anglers also recognize that fish tend to be attracted to visual stimuli such as the reflection of sunlight off a spoon or the illumination provided by an electronic fishing lure. In electronic fishing lures, the challenge has been to blend the realistic attributes of the prey and the attractive effect of visual stimuli all into one relatively compact, uncomplicated, inexpensive yet realistic fishing lure which is usable in a variety of fishing environments.

One example of an electronic fishing lure is disclosed in U.S. Pat. No. 5,157,857. The electronic fishing lure disclosed thereby includes a light emitting diode (LED) and a battery therefore. This fishing lure when powered by the battery is not activated until the electrical circuit is placed in the water since the water is necessary to complete the circuit path. Thus, there is a risk that when retrieving this fishing lure across or near the water surface, the circuit may be broken and the LED deactivated. In addition, such an arrangement does not permit ready replacement of the battery since the terminals of the electrical components are affixed to the battery itself such as by an adhesive, soldering or welding.

Another example of an electronic fishing lure is disclosed by U.S. Pat. No. 3,940,868 which discloses a LED that can be mounted to the hook and a power source therefore which is mounted separate from the hook. Since the power source is separate, the power source is located on an independent structure either intermediate the hook and the fishing line or else directly on the fishing line. Such an arrangement, however, does not disclose a fishing lure having a light source and power source mounted directly to the hook so as to provide as natural a presentation as possible to attract a fish and at the same time avoid having to secure structure to the fishing line. Anglers will appreciate that added structure on the line may cause fraying, crimping or damage to the line which might increase the risk of line breakage. It is desirable that the line integrity be maintained since large, potentially trophy size fish may apply stress to the line which approaches the maximum load that the line may withstand.

It is desirable therefore to provide an electronic fishing lure which provides as natural a presentation as possible with respect to both the appearance and the action of the fishing lure. It is also desirable that the light source and the power source be connected to the fishing hook without requiring additional structure which might detract from the natural appearance of the fishing lure. It is further desirable that the electronic fishing lure be operable when retrieved both on the surface and submerged and that the power source, i.e. the battery, be readily removed for replacement of the battery or deactivation of the light source. Since insects such as fireflies are a natural food source for fish, it further is desirable to provide an electronic fishing lure which imitates a firefly including the preferred size and intermittent illumination characteristics thereof.

SUMMARY OF THE INVENTION

This invention, in a preferred embodiment, relates to an electronic fishing lure which simulates the appearance, size and action of a firefly by incorporating both a light source and a power source on a single fishing hook of standard size and construction. The electronic firefly lure is provided with a green blinking LED secured to the fishing hook and a plurality of feather-like materials which are wrapped about the LED for an additional attractive effect. A mounting plate is provided to readily receive and retain a compact battery thereon between the mounting surface and a spring clip which serves to complete an electrical circuit to activate the LED. The battery is readily engaged and disengaged from the electronic firefly lure so as to activate and deactivate the LED and facilitate ready replacement of the battery after the working life thereof.

With such an arrangement, the electronic firefly lure imitates the look and action of a firefly and does so without the use of coverings, complex electrical and mechanical connections, or additional structures separate from the hook which may appear unnatural to the sought after fish and increase the cost of the lure. Such an arrangement may also be modified to simulate other types of insects or prey.

DETAILED DESCRIPTION

Figure 1:
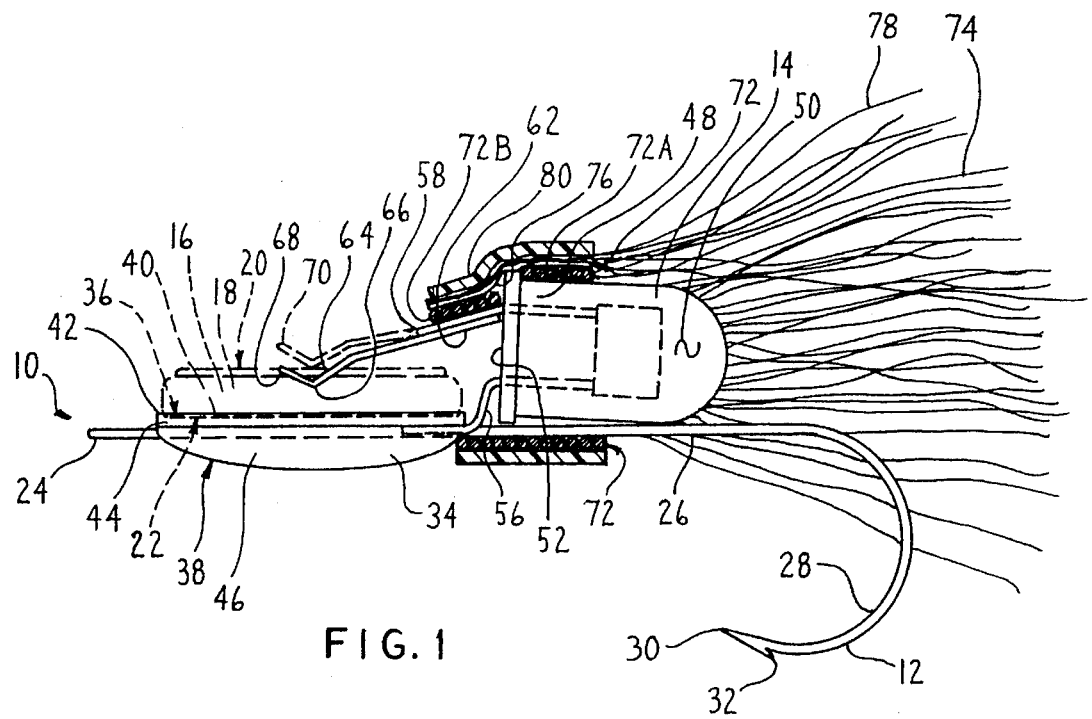
FIG. 1 is a side elevational view of an electronic firefly lure according to the invention.

Referring to FIG. 1, the electronic fishing lure 10 includes a hook 12, a light source 14 and a power source 16 which is preferably adapted to flash intermittently to simulate the appearance and action of a firefly.

In particular, the power source 16 typically is a battery 18 having a negative terminal 20 and a positive terminal 22. Preferably the negative terminal 20 faces away from the hook 12 and the positive terminal 22 faces toward the hook 12 although the battery 18 may be oriented with the terminals 20 and 22 reversed if desired. The battery 18 preferably is a miniature or compact battery of standard construction, i.e. which is a flat cylinder having an axial height which is less than the diameter thereof and which are commonly used in watches and the like. An example of such a battery is a Panasonic three volt battery, model number BR 1225, which provides the desired size and voltage. It should be recognized that any other suitable power source may be provided so long as the desired voltage and dimensions are provided thereby as can be appreciated from the following discussion.

The hook 12 is a fishing hook of standard construction which includes an eyelet 24, a shank 26 and an arcuate hook portion 28 which terminates at a pointed end 30. Preferably the pointed end 30 is provided with a barb 32 as commonly provided on standard fishing hooks.

Figure 2:
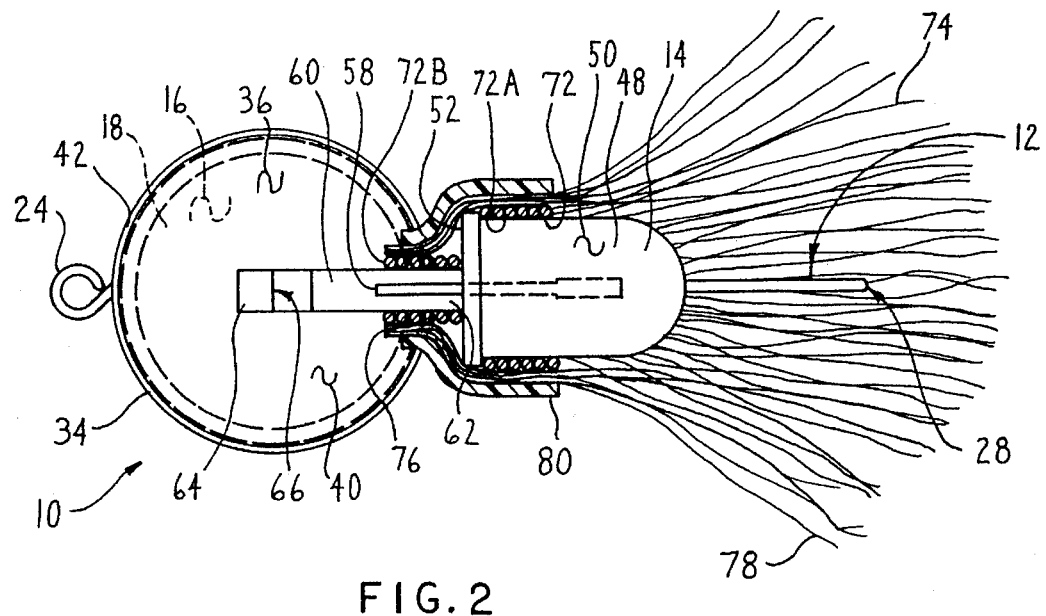
FIG. 2 is a top view of the electronic fishing lure shown in FIG. 1.

Referring to FIGS. 1 and 2, the electronic fishing lure 10 also includes a battery mounting plate 34 which is defined by a battery receiving surface 36 facing away from the shank 26 and a convex bottom surface 38 opposite the battery receiving surface 36. The battery receiving surface 36 is formed with a shallow recess 40 defined by a peripheral annular rim 42 which is adapted to receive the battery 18 therein and help prevent dislodgement of the battery 18. The depth of the recess 40 need only be very small to sufficiently prevent dislodgement of the battery 18, although FIG. 1 illustrates the depth somewhat exaggerated to help visualize and describe the location and arrangement of the recess 40.

The battery mounting plate 34 is formed by a planar circular slug 44, the top of which serves as the battery receiving surface 36. The circular slug 44 preferably is stamped from electrically conductive sheet metal and is provided with a lead coating for corrosion resistance.

The battery mounting plate 34 also includes a curved section 46 which defines a convex or rounded bottom surface 38. The curved section 46 is constructed of an electrically conductive material and is formed so as to be attached to the slug 44 with the shank 26 of the hook 12 secured therebetween as seen in FIG. 1. Preferably, the slug 44 and the curved section 46 are fixedly secured one with the other by soldering or other similar techniques such that the shank 26 of the hook 12 is fixed integrally through the battery mounting plate 34 with the eyelet 24 disposed on one side and the arcuate hook section 28 disposed on the other side. In such a manner, the battery receiving surface 36 is fixed relative to the hook 12 such that the battery 18 may be received therein on the side of the shank 26 opposite the pointed end 30 of the hook 12.

As FIGS. 1 and 2 illustrate, the light source 14 preferably is a light emitting diode (LED) defined by a translucent bulbous end 48 having an outer surface 50 and a planar end 52 facing toward the eyelet 24. The preferred light source 14 is a blinking LED, such as Everlight part number F336GD, since such LED has the blinking switching built integrally therein. To accurately imitate the appearance of a firefly, the LED preferably should have a green color although other colors may be desirable.

The light source 14 includes a positive terminal 56 and a negative terminal 58. The positive terminal 56 preferably is bent into a stepped arrangement as seen in FIG. 1 which extends down towards the shank 26 of the hook 12 and then rearwardly toward the battery mounting plate 34.

When attaching the battery mounting plate 34 to the shank 26 as previously described herein, the positive terminal 56 of the light source 14 is secured within the battery mounting plate 34 as seen in FIG. 1. As a result, the positive terminal 56 is electrically connected to the battery receiving surface 36 preferably by the use of electrically conductive materials in or for the battery mounting plate 34.

The negative terminal 58 is disposed a farther distance away from the shank 26 than the positive terminal 56 and projects rearwardly from the planar end 52 of the light source 14 toward the eyelet 24. Preferably, the negative terminal 58 is adapted to be a predetermined spaced apart distance away from the battery receiving surface 36 to facilitate positioning of a battery retainer clip 60, where the spaced apart distance should be approximately 0.1 inches (2.54 mm).

The electronic fishing lure 10 includes the battery retainer clip 60 having a fixed proximal end 62 and a cantilevered distal end 64 which projects over the battery receiving surface 36. Preferably the battery retainer clip 60 is constructed of an electrically conductive spring steel wherein the fixed end 62 is soldered to the negative terminal 58 of the light source 14 so as to maintain an electrical connection therebetween.

The distal end 64 of clip 60 preferably has a downwardly projecting V-shape when viewed from the side as seen in FIG. 1. As a result of the V-shape, the distal end 64 is provided with an apex 66 which serves as a contact point for abutment against the negative terminal 20 of the battery 18 when the battery 18 is inserted between the distal end 64 and the battery receiving surface 36.

The apex 66 is disposed in a first position 68 which is a predetermined distance above the battery receiving surface 36. To retain the battery 18 between the apex 66 and the battery receiving surface 36, the apex 66 is flexed upwardly away from the battery receiving surface 36 by the battery 18 to a second position 70 to accommodate and retain the battery 18 therebetween. Use of a spring steel material for the retainer clip 60 facilitates insertion of the battery 18.

Flexing of the retainer clip 60 to the second position 70 also applies a biasing force to the battery 18 to prevent dislodgement thereof when the lure is being cast and retrieved or when landing a fish. It should be recognized that the use of spring steel in the retainer clip 60 also permits accommodation of batteries 18 with varying thicknesses.

When in contact with the negative terminal 20 of the battery 18, the apex 66 completes an electrical circuit through the above-identified and described components of the electronic fishing lure 10 so as to effect blinking of the light source 14.

The fishing lure 10 also includes means for securing the light source 14 to the shank 26 of the hook 12, which means includes a first material layer 72 which is wrapped about the outer surface 50 of the light source 14 as well as the shank 26 to form a securing sleeve. The first material layer 72 is preferably comprised of cotton thread as illustrated in FIGS. 1 and 2 where the windings of thread form a first section 72A wrapped about the base end of the light source 14. The windings of thread are continued to form a second section 72B which extends beyond the planar end 52 and is wrapped about the positive and negative terminals 56 and 58 and the battery retainer clip 60. By wrapping both the light source 14 and the positive and negative terminals 56 and 58 as well as the battery retainer 60, the rigidity of the battery retainer clip 60 is increased so as to increase the durability of the fishing lure 10. It should be recognized that the first material layer 72 may be formed with a variety of constructions and materials so long as the light source 14 is secured to the shank 26 and if necessary, the rigidity of the battery retainer clip 60 is sufficiently increased.

Once the light source 14 is banded by the first material layer 72, an adhesive (not illustrated) is preferably applied to the first material layer 72 so as to saturate this layer 72. Preferably the adhesive (not illustrated) is a cyanoacrylate, commonly referred to as "super glue".

To provide a realistic firefly appearance to the electronic fishing lure 10, a plurality of feather-like strands 74 are disposed about the periphery of the first material layer 72 with one end 76 terminating proximate the planar end 52 of the light source 14 and a second end 78 terminating away from the light source 14 and the arcuate portion 28 of the hook 12. The feather-like strands 74 may be provided at the same time as the adhesive so as to be secured thereto.

Preferably the feather-like strands 74 are of a yellow color although other fish attractive colors and materials may be used. The feather-like strands 74 or other suitable fish attractive materials serve to supplement the attractive effect of the blinking light source 14.

Besides having the feather-like strands 74 secured about the first material layer 72 by the adhesive (not illustrated), a second material layer 80 preferably is provided about the periphery of the first material layer 72 as well as about the feather-like strands 74 such that the strands 74 are bound therebetween. The second material layer 80 preferably is a plastic shrink tube adapted to be banded about the feather-like strands 74. The second material layer 80 is formed of polyolifin or other suitable material which can be wrapped about the electric fishing lure 10 in gripping engagement.

In operation, an angler secures a fishing line to the eyelet 24 of the hook 12 and inserts the battery 18 in place such that the positive terminal 22 thereof electrically contacts the battery receiving surface 36 and the negative terminal 20 electrically contacts the apex 66 of the battery retainer clip 60. Once the battery 18 is inserted, the light source 14 is energized to begin blinking and imitate the natural appearance of a firefly.

In using the electronic fishing lure 10, the angler may either retrieve the electronic fishing lure 10 below the surface or may jig the electronic fishing lure 10 along the surface which is possible since the battery 18 continues to energize the light source 14 whether above or below the surface. As a result, the blinking light source 14 in combination with the feather-like strand 74 imitates the appearance and action of a firefly which serves to attract fish.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An electronic fishing lure comprising:
    a hook having a shank, an eyelet at a first end of said shank for attachment of a fishing line, and an arcuate hook section extending from a second end of said shank;
    a light source mounted to said shank and having first and second electrical terminals;
    a mounting plate mounted to said shank intermediate said eyelet and said light source and having a receiving surface facing away from said shank, said receiving surface adapted to seat a battery thereon, said mounting plate including means for electrically connecting said receiving surface to said first electrical terminal; and
    biasing means having a proximal end electrically connected to and fixed relative to said second terminal of said light source and a distal end disposed a spaced apart distance above said receiving surface for biasing said battery between said distal end and said receiving surface to prevent dislodgement thereof, said distal end being in electrical communication with said second electrical terminal so as to complete an electrical circuit path and activate said light source when said battery is engaged between said receiving surface and said distal end.

2. The fishing lure as defined in claim 1, wherein a plurality of elongate feather-like members are positioned in generally surrounding relation to said light source and projecting outwardly therebeyond to at least partially surround said hook section, said members having base end parts thereof fixedly secured relative to said light source.

3. The fishing lure as defined in claim 1, wherein said receiving surface has a recess defined by a peripheral rim, said recess and peripheral rim receiving said battery therein.

4. The fishing lure as defined in claim 1, wherein said mounting plate includes a planar plate positioned on one side of said shank and a convex plate on an opposite side of said shank, said planar plate and said convex plate being secured together with said shank fixedly secured therebetween.

5. The fishing lure as defined in claim 1, wherein said light source is a blinking LED.

6. The fishing lure as defined in claim 1, wherein said distal end projects over said receiving surface and is normally spaced therefrom by a distance which is less than a thickness of the battery so as to force fittingly receive the battery between said distal end and said receiving surface.

7. The fishing lure as defined in claim 6, wherein said battery is removable to deactivate said light source.

8. The fishing lure as defined in claim 1, wherein mounting means are provided for mounting said light source to said shank, said mounting means comprising at least a first material layer disposed about said light source and said shank.

9. The fishing lure as defined in claim 8, wherein a plurality of fish attractive materials are disposed about an outer peripheral surface of said first material layer, said mounting means including a second material layer wrapped about said light source and said shank with said fish attractive materials being fixedly secured between said first and second material layers.

10. The fishing lure as defined in claim 9, wherein said mounting means includes an adhesive between said first and second material layers.

11. The fishing lure as defined in claim 10, wherein said first material layer is formed with a first section disposed about said light source for securing said light source to said shank and a second section disposed about at least said proximal end of said biasing means and said shank for supporting said biasing means.

12. An fishing lure for use with a removable electrical source, said lure comprising:
    a hook having a shank, an eyelet at a first end of said shank for attachment of a fishing line, and an arcuate hook section extending from a second end of said shank;
    a light source mounted to said shank and having first and second electrical terminals;
    a plurality of elongate feather-like members positioned in generally surrounding relation to said light source and projecting outwardly therebeyond to at least partially surround said hook section, said members having base end parts thereof fixedly secured relative to said light source;
    mounting means provided for mounting said light source to said shank, said mounting means comprising at least a first sleeve like material layer disposed about said light source and said shank;
    a mounting plate mounted to said shank intermediate said eyelet and said light source and having a receiving surface, said receiving surface having a recess defined by a peripheral rim and adapted to removably seat said electrical source thereon, said mounting plate including means for electrically connecting said electrical source receiving surface to said first electrical terminal of said light source; and
    biasing means having a proximal end electrically connected to and secured to said second terminal of said light source and a distal end disposed a spaced distance away from said receiving surface for engaging and holding said electrical source between said distal end and said receiving surface so as to complete an electrical circuit path and activate said light source.

13. The fishing lure as defined in claim 12, wherein said mounting plate includes a planar plate positioned on one side of said shank and a convex plate on an opposite side of said shank, said planar plate and said convex plate being secured together with said shank fixedly secured therebetween.

14. The fishing lure as defined in claim 12, wherein said distal end projects over said receiving surface and is normally spaced therefrom by a distance which is less than a thickness of the battery so as to force fittingly receive the electrical source between said distal end and said receiving surface.

15. The fishing lure as defined in claim 12, wherein said light source is a blinking LED.

16. The fishing lure as defined in claim 12, wherein said mounting means further includes a second material layer wrapped about said light source and said shank with said feather-like members being fixedly secured between said first and second material layers.

17. The fishing lure as defined in claim 16, wherein said mounting means includes an adhesive between said first and second material layers.

18. The fishing lure as defined in claim 17, wherein said first material layer is formed with a first section disposed about said light source for securing said light source to said shank and a second section disposed about at least said proximal end of said biasing means and said shank for rigidly supporting said biasing means.

19. An electronic fishing lure comprising:

a battery;

a hook having a shank adapted to be connected to a fishing line at a first end of said shank and an arcuate hook section extending from a second end of said shank;

an LED light source mounted to said shank;

a plurality of feather-like members positioned in generally surrounding relation to said LED and projecting outwardly therebeyond to at least partially surround said hook section, said members having base end parts fixedly secured relative to said LED;

a mounting plate mounted to said shank proximate said LED and adapted to seat said battery thereon;

a battery retaining clip having a proximal end fixed relative to said mounting plate and a distal end disposed a spaced apart distance above said mounting plate, said battery disposed between said battery retaining clip and said mounting plate; and means defining a circuit path for activation of said LED when said battery is disposed between said battery retainer clip and said mounting plate.

* * * * *